United States Patent [19]

Seem

[11] Patent Number: 5,414,640

[45] Date of Patent: May 9, 1995

[54] METHOD AND APPARATUS FOR ADAPTIVE DEMAND LIMITING ELECTRIC CONSUMPTION THROUGH LOAD SHEDDING

[75] Inventor: John E. Seem, Menomonee Falls, Wis.

[73] Assignee: Johnson Service Company, Milwaukee, Wis.

[21] Appl. No.: 216,601

[22] Filed: Feb. 23, 1994

Related U.S. Application Data

[63] Continuation of Ser. No. 725,314, Jul. 5, 1991, abandoned.

[51] Int. Cl.$^6$ .............................................. H02J 3/14
[52] U.S. Cl. .................................... 364/493; 364/492; 307/39; 307/35
[58] Field of Search ............... 364/483, 484, 492, 493; 307/35, 39, 40, 41

[56] References Cited

U.S. PATENT DOCUMENTS

| | | | |
|---|---|---|---|
| 3,862,430 | 1/1975 | Lenhart et al. | 307/35 |
| 4,110,825 | 8/1978 | Fox et al. | 364/492 |
| 4,136,392 | 1/1979 | Westphal et al. | 364/492 |
| 4,141,069 | 2/1979 | Fox | 364/493 |
| 4,204,127 | 5/1980 | Carter, II | 307/39 |
| 4,337,401 | 6/1982 | Olson | 307/39 |
| 4,464,724 | 8/1984 | Gurr et al. | 364/492 |
| 4,510,398 | 4/1985 | Culp et al. | 307/35 |
| 4,620,283 | 10/1986 | Butt et al. | 364/493 |
| 4,916,328 | 4/1990 | Culp, III | 307/39 |

*Primary Examiner*—Vincent N. Trans
*Attorney, Agent, or Firm*—Foley & Lardner

[57] ABSTRACT

A load shedding apparatus for limiting peak electrical demand in an electrical system to a target level through load shedding. The apparatus employs predictive control logic to estimate the amount of energy that needs to be shed in a predetermined future period. Preferably, the load shedding apparatus forecasts the amount of energy require in a predetermined future period by analyzing current energy consumption, current load shedding, and error factors indicative of the random energy demand characteristics of the electrical system. The apparatus estimates the amount of energy that needs to be shed in view of the forecast of the amount of energy required in the predetermined future period. The apparatus selects non-essential loads for shedding until the estimated amount of energy that needs to be shed is reached. The apparatus transmits shed control signals to selected devices within the electrical system to disconnect the selected devices.

14 Claims, 5 Drawing Sheets

METHOD AND APPARATUS FOR ADAPTIVE DEMAND LIMITING ELECTRIC CONSUMPTION THROUGH LOAD SHEDDING

This is a continuation of application Ser. No. 07/725,314, filed Jul. 5, 1991, abandoned.

BACKGROUND OF THE INVENTION

The present invention relates generally to load shedding systems, facility management systems or demand limiting systems. In particular, the invention relates to load shedding systems utilizing predictive logic for employing peak demand shaving operations for energy bill minimization.

As is well known in the art, a facility management system can limit peak demand by turning off non-essential electrical equipment in a building. Owners or operators of commercial buildings are billed for electric power based in significant part upon the peak demand of energy consumed during a billing period. Thus, by limiting peak demand, owners or operators can minimize electric bills.

Load shedding systems are generally known in the art. Most load shedding systems employ relatively unsophisticated control systems for shedding loads. The less sophisticated control systems make shedding determinations based solely on current electrical demand data, and are disadvantageous because they are prone to a significant amount of on-off exercising. On-off exercising, or short cycling, refers to the turning on and off of loads in a short period of time.

On-off exercising makes load shedding systems inefficient. For instance, if such a load shedding system determines that too much electricity is being used, it will shed a load. If the load is large enough, the system will determine that more electricity can be used and will allow the load to be turned back on. Such cycling could be perpetual. As the cycle continues, electricity is wasted and the user is annoyed as the load is continually restarted.

The random nature of electrical consumption further complicates the situation. For example, people in buildings are constantly turning on and off lights and other appliances in a random manner. The demand profile of a building changes randomly as a result of this activity. After a load shedding system restores a previously shed load and allows the energy demand to approach a predetermined target level, the random use of appliances could force the load shedding system to once again disconnect a recently restored load. Thus, the random nature of electrical consumption contributes to the on-off exercising problem.

Prior art systems attempt to solve the on-off exercising problem by providing separate shed limits and restore limits. The restore limit is set below the shed limit. Under this scheme, a load is shed at a particular shed limit and not restored until the consumption level falls below a restore limit. Although this prior art method provides some relief to the on-off exercising problem, such a system is prone to excessive shedding because loads are not restored until the consumption level falls below the restore limit, a level below the shed limit. Excessive shedding is disadvantageous because the operator is annoyed as appliances are shed unnecessarily.

Less sophisticated prior art systems are also unable to adapt to a specific building's random demand characteristics. In prior art systems, shedding decisions are based upon current electrical demand data, thus making automatic adaption to the building's random demand characteristics impossible.

More sophisticated prior art systems employ predictive control logic. Such systems periodically measure the total accumulated energy consumption from the beginning of a demand interval. A predicted end-of-interval demand is determined based on the rate of accumulated consumption measured and the amount of time left in the demand interval, and a predicted present demand is interpolated based upon the same two factors and the predicted end-of-interval demand. If the predicted present demand exceeds maximum desired demand, a load is shed. Although such systems project the total consumption over an interval, the projection is based only on past consumption during the current demand interval. Thus, such systems are prone to inaccuracy because extraordinary measurements at a few points in time can affect load shedding operations across an entire interval. Also, such systems are inaccurate because they do not adapt to a specific building's random demand characteristics. Such inaccuracy may lead to excessive shedding or to energy consumption beyond a pre-established target level. Such systems are also disadvantageous because they are susceptible to on-off exercising for the same reasons as described above in connection with less sophisticated prior art load shedding systems.

SUMMARY OF THE INVENTION

The present invention provides a load shedding system not susceptible to the disadvantages of the prior art. Specifically, the present invention creates a more accurate prediction of the amount of energy that presently needs to be shed than was attainable with prior art systems. The system of the present invention is accurate and avoids significant on-off exercising because its predictions consider both the current amount of energy being used and the current amount of energy being shed. Thus, a load shedding system according to the present invention is more accurate and less susceptible to on-off exercising than prior art systems.

The present invention also adapts itself to an individual building's random demand characteristics, thereby further enhancing accuracy. The present invention employs adaptive error adjustment to accurately predict the amount of energy that needs to be shed. The error adjustment employed by the present invention is able to be adaptive because the error adjustment is based upon past as well as current load measurements. Thus, a load shedding system in accordance with the present invention is more accurate because it automatically adjusts its predictions to a specific building's demand characteristics.

Accordingly, it is an object of the present invention to provide a load shedding system which accurately determines the amount of energy that presently needs to be shed by considering the current amount of energy being used and the current amount of energy being shed.

Another object of the present invention is to provide a load shedding system which determines the amount of energy that presently needs to be shed without significant on-off exercising.

A further object of the present invention is to provide a load shedding system which accounts for a specific building's random demand characteristics in determining the amount of energy that presently needs to be shed.

Yet another object of the present invention is to provide a load shedding system which employs predictive control logic with small memory requirements, power requirements, and computational time requirements.

Further objects and features of the present invention will be apparent from the following specification and claims when considered in connection with the accompanying drawings illustrating the preferred embodiment of the invention.

BRIEF DESCRIPTION OF THE DRAWINGS

A preferred exemplary embodiment of a load shedding system in accordance with the present invention will hereinafter be described in conjunction with the appended drawings wherein like designations denote like elements in the various figures, and.

DETAILED DESCRIPTION OF A PREFERRED EXEMPLARY EMBODIMENT

Figure 1:
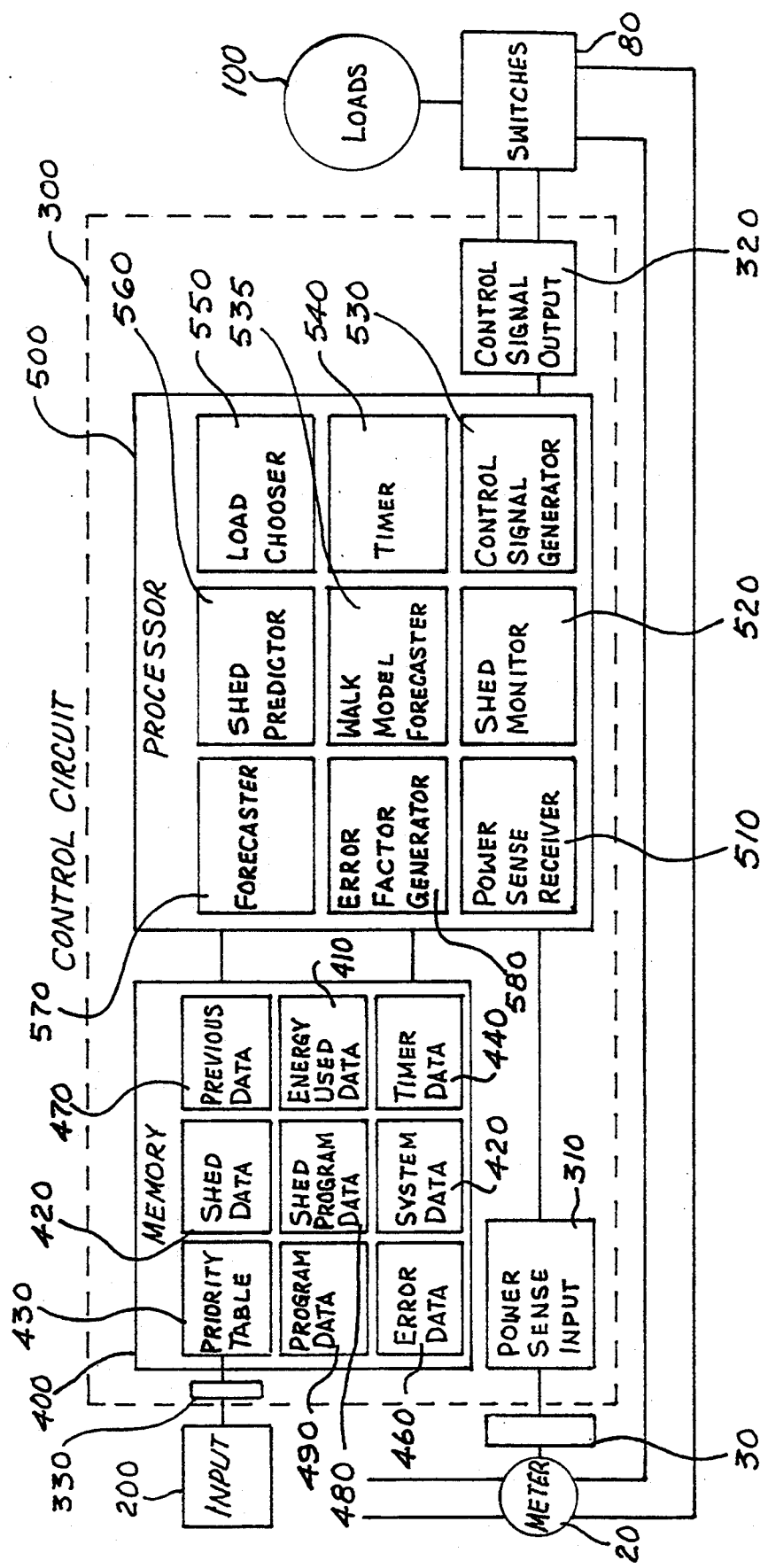
FIG. 1 is a schematic block diagram of an exemplary load shedding system in accordance with the present invention.

FIG. 1 is a schematic block diagram of an exemplary load shedding system in accordance with the present invention. In FIG. 1, a load shedding system 10 controls an electrical network 50. Loads 100 are generally appliances, environmental control units, machinery, motors, lights and other electric devices. Loads 100 are connected to network 50 through switches 80.

Load shedding system 10 adjusts the electric consumption through loads 100 by transmitting control signals to switches 80. Switches 80 are generally relays, motor starters, semiconductor switches, or any other control devices capable of affecting the electrical consumption of an electrical device. Although switches 80 are often of the type that affect the electrical consumption of loads 100 by disconnecting or connecting loads 100 from electric network 50, switches 80 are not necessarily limited to such functions. For example, switches 80 may be configured to adjust the electrical demand loads 100 by less drastically attenuating or increasing the demand by loads 100.

The amount of electricity consumed by loads 100 is measured by meter 20. Meter 20 is a typical meter of a type usually supplied by a utility company. Power sensor 30 is usually co-located with meter 20 and provides system 10 with information relating to the amount of energy supplied to loads 100.

Operator input 200 provides data to control system 300. Operator input 200 is preferably a keyboard and an associated CRT for communicating data by an operator to control system 10. However, data from operator input 200 could also be provided by a sensor, an EPROM chip, ROM chip, switches, buttons, or other devices for inputting data to control means 300.

Control system 300 is comprised of a memory device 400 and a processor device 500. Control system 300 further comprises power sense input 310, control signal output 320, and data input/output 330. In an alternate embodiment, power sense input 310, control signal output 320, and data input/output 330 may be configured as one or two input/output ports.

Power sense input 310 provides a control link between control system 300 and power sensor 30 or meter 20. Power sense input 310 is configured to provide necessary input signal conversions and isolation for operation of processor device 500 and control system 300.

Control signal output 320 provides a link between control system 300 and switches 80. Control signal output 320 provides necessary output signal conversions and isolation for operation of processor 500 and control system 300.

Data input/output 330 provides a link between control system 300 and operator input 200. Data input/output 330 allows data to be transmitted into and out of memory device 400 and into and out of processor 500. Generally, data flows through processor 500 when entering or leaving control system 300. Data from operator input 200 is input into memory device 400 through data input/output 330, and data from memory device 400 can be outputted to operator input 200 through data input/output 330 for display on a CRT. Data input/output 330 also provides necessary isolation or conversions for operation of processor 500 and control system 300. In an alternate embodiment, data input/output 330 may also link other load shedding systems or other data supplies in a network configuration.

Control system 300 makes appropriate shedding decisions based upon information from power sense input 310, data input/output 330, and information stored in memory device 400. Control system 300 transmits control signals to switches 80 through control signal output 320.

Memory device 400 stores various data received through power sense input 310 and data input/output 330. Some information may also be programmably stored in memory device 400. Memory device 400 may be a RAM chip or chips, a ROM, an EPROM, a disk drive, any other memory device, or any combination of such devices. Memory device 400 may be situated internally within processor 500. Memory device 400 stores various data which may be used by processor 500.

Control system 300 generally operates in the following manner. Data is input to control system 300 by a user through operator input 200 and stored in memory device 400. Such data could also be stored in memory device 400 by various other data devices such as ROM chips, RAM chips, EPROM chips, or disks.

After the data has been input, control system 300 is ready to direct load shedding operations. Control system 300 can be operated in two modes, depending on the type of billing scheme employed by the utility providing electrical power to the site at which control system 300 is employed. Utilities generally have two billing schemes: 1) a fixed billing interval scheme and 2) a non-fixed billing interval scheme. Under the fixed billing interval scheme, the start time for a billing interval is known, and the utility surcharges any peak use during each billing interval. Under the non-fixed billing interval scheme, the utility monitors the load use, and surcharges any continuous interval within which the consumer uses electricity in excess of that consumer's average use. In other words, with the non-fixed billing interval scheme, the utility employs a sliding window to determine the billing interval during which peak use is experienced. The mode of operation of control system 300 may be selected appropriately to accommodate the billing scheme employed by the utility providing electrical power to the site at which control system 300 is employed. Mode selection may be effected by a user through operator input 200, or mode selection may be effected automatically by a signal generated by the utility company and transmitted via the power lines by which electrical power is supplied. System 10 preferably operates in the appropriate mode in order that it may shed loads most efficiently.

Figure 3:
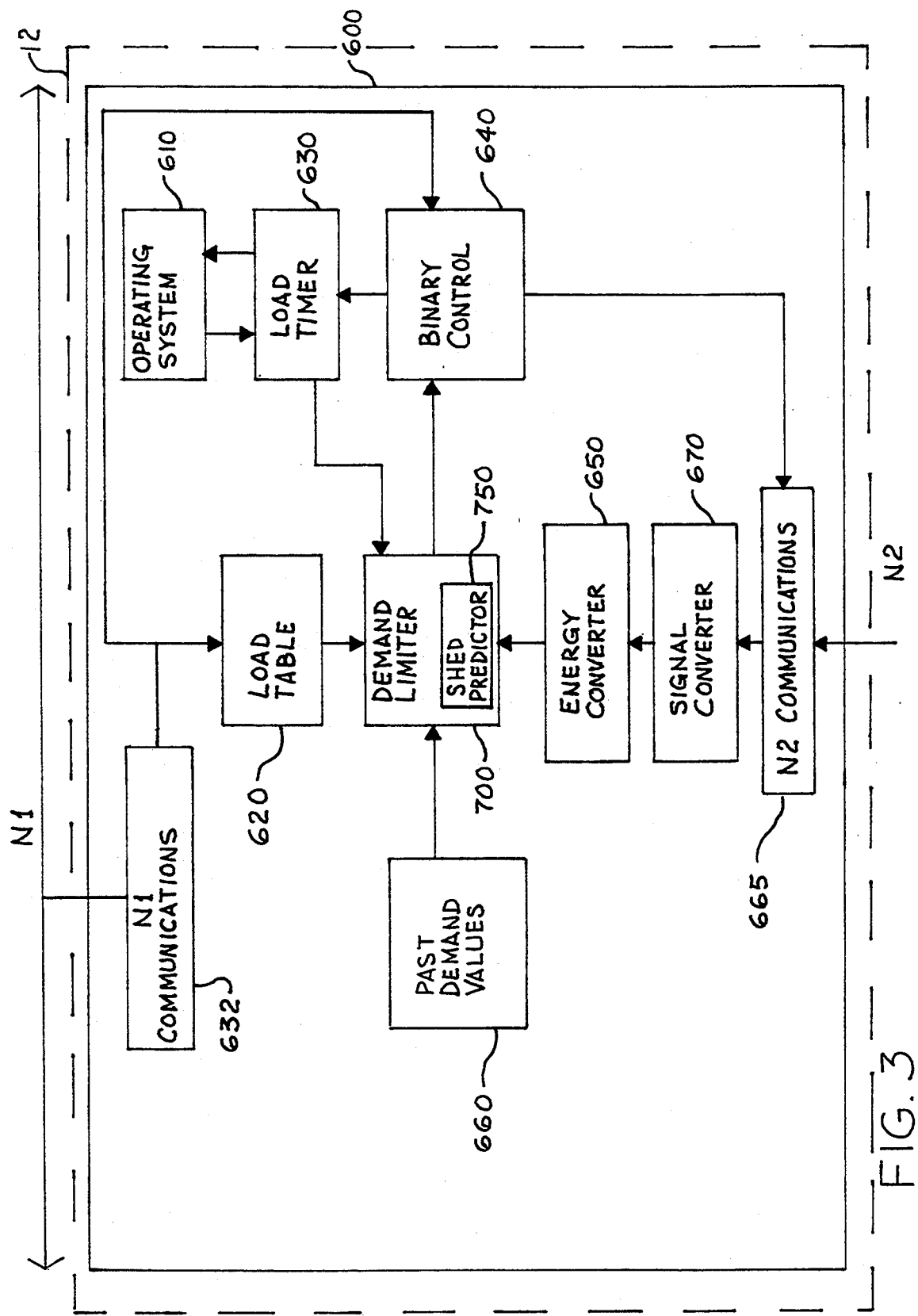
FIG. 3 is a schematic block diagram of a control system used in the load shedding system.
Figure 5:
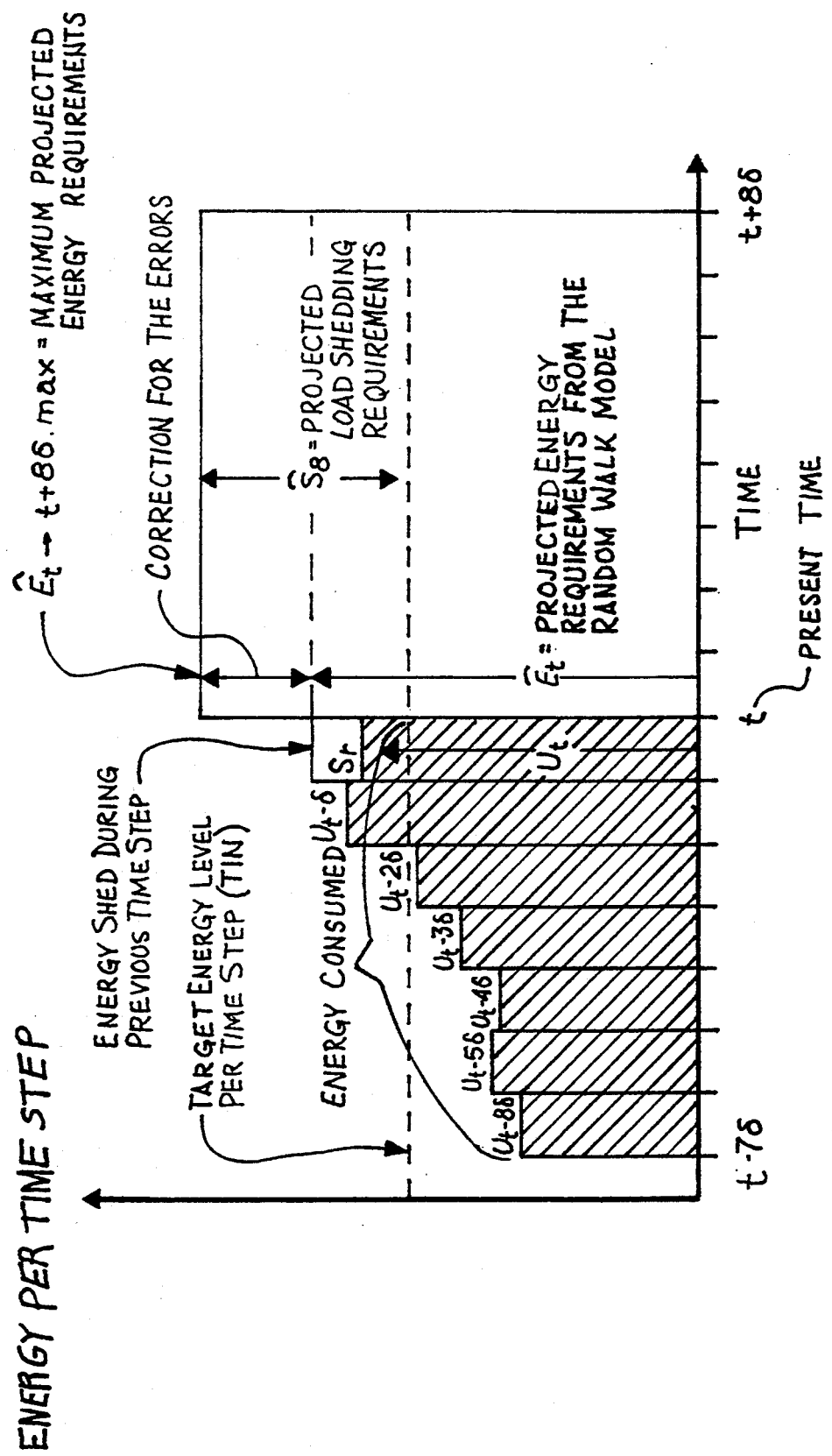
FIG. 5 is a graph representing the demand profile over a demand interval of a system controlled by an apparatus in accordance with the present invention.

With reference to FIG. 5, FIG. 3, and FIG. 1, load shedding system 10 operates over a fixed demand interval in mode 1. In FIG. 5, a 15 minute demand interval is divided into 15 one minute time steps. The current time is represented by t, t represents the seventh minute of the demand interval in the particular illustration of FIG. 5. As the seventh minute in the demand interval ends and the eighth minute begins, control system 300 analyzes the data so that it can appropriately shed selected loads.

With reference to FIG. 5, N represents the number of time steps in the demand interval. As stated above and as represented in FIG. 5, the demand interval covers 15 times steps; therefore, N equals 15. The symbol $\delta$ represents the length of one time step; the length of one time step, $\delta$, is preferably one minute. Thus, the total demand interval covers N $\delta$ minutes, or 15 minutes.

In FIG. 5, a "snapshot" is represented of a demand interval at time t, so that eight time steps remain until the end of the demand interval. In other words, there are eight time steps in between time t and $t+8\delta$. The number of time steps left in the demand interval is represented by the letter n; therefore, n equals 8 in this particular illustration.

In FIG. 5, there have been 7 time steps which have occurred in the demand interval. These time steps occurred between time $t-7\delta$ and time t. Thus, the previous time step (with respect to time t) is the seventh time step from the beginning of the demand interval. In other words, the previous times step occurred between time $t-\delta$ and t.

$U_t$ represents the amount of energy used in the previous time step; that is, $U_t$ represents the amount of energy used in between times $t-\delta$ and t. $U_{t-\delta}$ represents the amount of energy used in the time step preceding the previous time step; that is, $U_{t-\delta}$ represents the amount of energy used between times $t-2\delta$ and $t-\delta$. The representations of the energy used in particular time steps, $U_{t-j\delta}$ where j=0 to N-(n+1), follow similar notations for all previous time steps in the demand interval until the first time step in the demand interval. In the demand interval shown in FIG. 5, $U_{t-6\delta}$ represents the amount of energy used in the first time step in the demand interval.

$S_t$ represents the amount of energy shed in the previous time step (with respect to time t); that is, the amount of energy shed between time $t-\delta$ and time t. $S_n$ represents the amount of energy that needs to be shed per time step in order to limit the energy consumption to the target level, T, over the demand interval. The dashed line T/N represents the target level per time step. In FIG. 5, $\hat{S}_n$ is $\hat{S}_8$ because there are eight time steps until the end of the demand interval (n=8).

The energy required per time step refers to the total amount of energy which would be used by the same network if a load shedding system were not employed. In other words, the energy required in a time step is equal to the total of energy actually used in the time step, plus energy shed in the time step.

Load shedding system 10 projects the energy required for the next time step by using a random walk model. The projected energy required per time step, $E_t$, from the random walk model, is equal to $U_t$ plus $S_t$. In other words, the random walk model prediction equals the total energy required in the previous time step. This basic prediction is based upon the premise that the immediately previous energy requirement should be similar to the next energy requirement. The maximum projected energy requirement per time step, $\hat{E}_{t-t+8\delta,max}$, is a value representing the random walk model, $\hat{E}_t$, plus an error factor representing previous random walk model forecasting errors.

Control system 300 measures the amount of energy consumed over the previous time step from signals supplied by power sensor 30 and power sense input 310. The previous time step in the example illustrated in FIG. 5 is the seventh time step, that is, the interval from time t to time $t-\delta$; the next time step is the eighth time step, that is, the interval from t to time $t+\delta$.

Power sensor 30 provides power sense input 310 with a pulse indicative of the total amount of energy passing through meter 20. Power sense receiver 510 determines the amount of energy consumed during the previous time step by subtracting the value of the previous pulse from the value of the current pulse. Power sense receiver 510 normalizes each value over its respective time step.

Power sense receiver 510 generates a value $U_t$ indicative of the amount of energy consumed over the previous time step. Power sense receiver 510 stores $U_t$ and its corresponding time step in memory device 400. Memory device 400 preferably stores such electricity-used data in an E used data register 410, which is specific memory location reserved for $U_t$.

Control system 300 also measures the amount of energy shed in the previous time step. Shed monitor 520 computes the amount of energy shed using data provided by load chooser 550 and priority table 430. Shed monitor 520 computes the amount of energy shed, $S_t$, by analyzing the selected loads that are shed and the amount of energy saved by shedding the selected load. Memory device 400 preferably stores the value, $S_t$, in reserved memory location, shed data register 420.

Walk model forecaster 535 creates a prediction for the energy requirement in the next time step, based upon the following equation:

$$\hat{E}_{t+j\delta} = U_t + S_t \qquad (1)$$

where:

$\hat{E}_{t,t+j\delta}$ = forecasted energy requirement during the time interval from t to $t+j\delta$ based upon information at time t;

j = a dummy index; and $U_t$ and $S_t$ are calculated as described above.

Walk model forecaster 535 stores the value for $\hat{E}_{t,t+j\delta}$ and its respective time step in memory device 400.

In processor 500, error factor generator 580 uses values $U_t$ and $S_t$ to compute an estimate of smoothed absolute error, $\Delta_t$. This estimate, $\Delta_t$, allows control system 300 to adaptively adjust its predictions to the random demand characteristics of the building.

The estimate of smoothed absolute error factor, $\Delta_t$, is determined according to the following equation:

$$\Delta_t = \Delta_{t-\delta} + \lambda(|U_t + S_t - \hat{E}_{t,t-\delta}| - \Delta_{t-\delta}) \quad (2)$$

where:

$\Delta_t$ = estimate of smoothed absolute error at time t;

$\Delta_{t-\delta}$ = estimate of smoothed absolute error at time $t-\delta$;

$\lambda$ = exponential smoothing constant;

$\hat{E}_{t,t-\delta}$ = forecast at time $t-\delta$ of the energy requirements between time $t-\delta$ and t from walk model forecaster 535;

and $U_t$ and $S_t$ are calculated as explained above. More specifically, the previous estimate, $\Delta t-\delta$, is the estimate of smoothed absolute error, $\Delta_t$, at time $t-\delta$ and is computed according to equation [2] by error factor generator 580 during the previous time step, the sixth time step in this example. The previous estimate, $\Delta t-\delta$, is stored in memory device 400 with its respective corresponding time step in a reserved register, error data 480 (FIG. 1).

The estimate of smoothed absolute error, $\delta_t$, provides a factor indicative of the specific building's random demand characteristics by determining the change in the amount of electricity required in the two previous time steps. This change (the difference between the amount of energy required in the time step preceding the previous time step and the amount of energy required in the previous time step) is given by the equation:

$$|U_t + S_t - \hat{E}_{t,t-\delta}| \quad (3)$$

As can be seen from equations [2] and [3], if the building's random demand characteristic has large fluctuations, the estimate smoothed absolute error, $\delta_t$, is large.

The estimate, $\Delta_t$, also reflects the building's entire history of random demand characteristics because the estimate, $\Delta_t$, is a function of previous estimate value, $\Delta_{t-\delta}$, as shown in equation [2]. If previous estimate value, $\Delta_{t-\delta}$, is large, the estimate, $\Delta_t$, is large. Thus, the building's history of random demand characteristics is a factor in the value of the estimate, $\Delta_t$.

Since the estimate of smoothed absolute error, $\Delta_t$, is dependent upon its own previous values (see equation [2] above), system 10 must be operated for at least one day in order to reliably calculate the estimate, $\Delta_t$. Longer initiation periods may be necessary to properly provide calculations of the estimate, $\Delta_t$, depending upon the duration of demand intervals employed and other variables. Such a relatively lengthy start-up time is necessary in order that the estimate of smoothed absolute value, $\Delta_t$, may reach appropriate values so that the system 10 will shed loads accurately. The start-up time may by decreased by starting with an initial value of the estimate of smoothed absolute value, $\Delta_t$, which is close to its appropriate value. Such estimated initial values may be derived empirically.

The other values used in equation [2] are explained in more detail below. The exponential smoothing constant $\lambda$ is stored in memory device 400. The forecast at time $t-\delta$ of the energy requirements between time $t-\delta$ and time t, $\hat{E}_{t,t-\delta}$, is stored in memory device 400 in a register, forecast data 570. This forecast, $\hat{E}_{t,t-\delta}$, is calculated at the beginning of the previous time step by walk model forecaster 535 as a prediction of energy required in the then-next time step.

After the estimate of smoothed absolute error at time t, $\Delta_t$ is assigned a value, processor 500, through forecaster 570, predicts the amount of energy required for the next time step. In the example of FIG. 5, the next time step is the eighth time step, that is, the time interval between time t and time $t+\delta$. Forecaster 570 creates a prediction value according to the following equation:

$$\hat{E}_{t\rightarrow t+n\delta,max} = U_t + S_t + Z_\alpha \sigma_1 \sqrt{\frac{n+1}{2n}} \quad [4]$$

where:

$\hat{E}_{t-t+n\delta,max}$ = forecast of the maximum energy requirement per time step for the next n time steps;

$Z_\alpha$ = standardized normal deviate at the $\alpha$ % confidence interval;

$\sigma_1 = 1.25\Delta_t$;

n = the number of time steps until the end of the demand interval; and $U_t$ and $S_t$ are calculated as explained above. This forecast of the maximum energy requirement is stored in memory device 400.

The prediction value, $\hat{E}_{t-t+n\delta,max}$, is a function of the current amount of energy used and the current amount of energy shed (see equation [4]). This prediction value, $\hat{E}_{t-t+n\delta,max}$, allows shed predictor 500 to more accurately determine the amount of energy that presently needs to be shed. In prior art systems, inaccurate predictions and determinations are often caused by previously shed loads being turned on. Forecaster 570 avoids these inaccuracies by accounting for the current amount of energy shed in its prediction value, $E_{t-t+n\delta,max}$. In prior art systems, some of the on-off exercising problems are also caused by previously shed loads being turned on. Forecaster 570 avoids some of the on-off exercising problems by accounting for the current amount of energy shed in its prediction value, $\hat{E}_{t-t+n\delta,max}$.

Forecaster 570 also provides a more accurate prediction value by using an error factor. In equation [4], the error factor is by described by following equation:

$$Z_\alpha \sigma_1 \sqrt{\frac{n+1}{2n}} \quad ; \text{where: } \sigma_1 = 1.25\Delta_t \quad [5]$$

As shown in equation [5], this error factor is a function of the estimate of smoothed absolute error, $\Delta_t$, which reflects random demand characteristics. Therefore, forecaster 540 provides a more accurate prediction value, $\hat{E}_{t-t+n\delta,max}$, and minimizes on-off exercising by accounting for the building's random demand characteristic with an error factor. Thus, forecaster 540 computes the prediction value, $\hat{E}_{t-t+n\delta,max}$, in order to maximize accuracy and minimize on-off exercising.

The standardized normal deviate, $Z_\alpha$, is preferably pre-stored in memory device 400. Alternately, the standardized normal deviate could be placed in memory device 400 via operator input 200. Depending on specifications, values for the standardized normal deviate are generally found in statistics literature known to those skilled in the art. For example, $Z_\alpha$ equals 1.96, 2.58, and 3.3 at confidence intervals of 95%, 99% and 99.9%, respectively. An appropriate confidence level is 95%.

Timer 540 monitors time expired and tracks the number of time steps that have passed in a demand interval. Timer 540 creates a value n, indicative of the number of time steps left in a demand interval. In the example of FIG. 5, n=8. The number of time steps left, n, is stored in memory device 400 in a register, timer data 440.

In order for load shedding system 10 to perform shedding operations, processor 500 must first determine the amount of electricity that needs to be shed in the next time step. In the example of FIG. 5, the next time step is the eighth time step, that is, the interval from time t to time t+δ. Shed predictor 560 computes a value representing the amount of energy that needs to be shed per time step in order to limit the demand of network 50 to a target level of demand, T (See FIG. 5). Shed predictor 560 determines this value according to the following equation:

$$\hat{S}_n = \hat{E}_{t \to t+n\delta,max} - \frac{T}{n} + \frac{1}{n}\left(\sum_{j=0}^{N-(n+1)} U_{t-j\delta}\right) \quad [6]$$

where:

$\hat{S}_n$ = forecast of the average amount of electricity that needs to be shed during each time step to limit the demand to T;

$\hat{E}_{t+n\delta,max}$ = forecast of the maximum electrical energy requirements per time step between time t and time t+nδ;

$U_{t-j\delta}$ = electrical energy consumed between time t−jδ−δ and time t−jδ.

N = the number of time steps in the demand interval; n as explained above; and

T = target consumption level over the demand interval.

N and T are programmed into memory device 400 through operator input 200. N and T are stored in system data 420, a reserved memory register in memory device 400. $\hat{S}_n$ is also stored in memory device 400 in a register, shed prediction data 460. Equation [6] does not restrict the energy consumption to the target level per time step on an individual time step basis. However, equation [6] does limit the energy consumption to the target level on a demand interval basis. In FIG. 5, the energy consumption in the previous time step is over the target level per time step. Most utilities bill for peak demand over the entire demand interval. Therefore, energy consumption over the target level per time step is not more costly as long as the target level is not exceeded for the entire demand interval.

After the amount of energy that needs to be shed per time step, $\hat{S}_n$, is determined by equation [6], control means 300 selects appropriate loads to shed from loads 100. Load chooser 550 makes such determinations by analyzing priority table 430 which contains data describing devices that can be turned off, electrical requirements of load shedding devices, minimum time that the device can be turned on, the maximum time that the device can be turned off, the amount of energy saved by shedding selected loads, and the order in which loads are shed.

The determinations concerning whether loads should be shed or restored is represented by the following relationships:

$$IF \hat{S} > \Sigma L_{off\text{-}off} \text{ THEN } \Sigma L_{on\text{-}off} = \hat{S} - \Sigma L_{off\text{-}off} \quad (7)$$

$$IF \hat{S} < \Sigma L_{off\text{-}off} \text{ then } \Sigma L_{off\text{-}on} = \Sigma L_{off\text{-}off} - \hat{S} \quad (8)$$

where $\hat{S}$ = projected load shedding requirements;

$\Sigma L_{off\text{-}off}$ = loads which are off and can remain off;

$\Sigma L_{on\text{-}off}$ = additional loads that need to be shed; and $\Sigma L_{off\text{-}on}$ = additional loads to be restored.

If the summation of the electrical loads which are off and can remain off (i.e., electrical loads shed over the past time step that can remain shed during the next time step) is greater than the projected shedding requirements, then no additional loads need to be shed and loads which are being shed can be turned on. If the summation of loads which are off and can remain off is less than the projected shedding requirements, then additional loads need to be shed.

Load chooser 550 determines appropriate loads to shed by analysis of priority table 430 and the amount of energy that needs to be shed, $\hat{S}_n$. If additional loads must be shed, load chooser selects the next load in priority table 430 (FIG. 1). If that load is not available because the load is locked, the load is off line, the operator has overridden control of the load by system 10, the load is already off, the maximum shed time is about to be reached, or the load has been on less than the minimum on time, the load chooser 550 selects the next load in priority as given in priority table 430. Load chooser 550 undergoes the same analysis until additional loads no longer need to be shed or until all sheddable loads have been analyzed.

When appropriate loads are chosen by load chooser 550, control system 300 provides appropriate control signals to switches 80 so that appropriate load shedding can be implemented. Control signal generator 530 creates appropriate control signals and transmits the control signals to the selected loads through control signal output 320.

After the selected loads are chosen, the timer 540 waits until the current time step ends. In this example, timer 540 clocks about one minute until the current time step ends. Timer 540 decrements the value n by one at the end of each time step as described by the following relation:

$$n = n - 1; \text{ from } N \text{ to } 1. \quad (9)$$

The value of n is stored in memory 400 in location timer data 440.

Load shedding system 10 is also capable of operating in a second mode when the demand interval is not fixed. The operations of system 10 are nearly identical to the operations in mode 1 except for the computation of $\hat{E}_{t-t+n\delta,max}$ and $\hat{S}_n$. Without a fixed interval, the value of n is unknown because the timer 540 does not have a demand interval start time for determining which time step it is. Timer 540 is still needed to determine the start and end of each time step.

With n unknown, forecaster 570 determines the energy required in the next time step, $\hat{E}_{t-t+n\delta,max}$, for all values of n from 1 to N for each time step. Each value is stored in memory 400. Shed predictor 560 also determines the amount of energy that needs to be shed, $\hat{S}_n$, for all values of n, and the discussed above N values of $\hat{E}_{t-t+n\delta,max}$. Shed predictor chooses the maximum value of $\hat{S}_n$ for all values of n. The maximum value of $\hat{S}_n$ is used by the processor as $\hat{S}_n$. The system 10 performs its other shedding operations and determinations as system 10 does in mode 1.

The exponential smoothing constant, λ, which is used by forecaster 570 is stored in memory 400. The exponential smoothing constant can be entered according to operator preference through operator input 200 or alternatively be programmed into memory 400 before installation. The value for the exponential smoothing constant has been determined to be optimal at approximately 0.0003. When $\lambda$ is approximately 0.0003, $\lambda$ is optimized because the margin of safety between the consumption per demand interval and the target level is maximized. However, values of this small of magnitude require a long start up time before $\Delta_t$ becomes accurate. Therefore, in a preferred embodiment, $\lambda$ is set between 0.005 and 0.01 in order to compromise between accurate prediction data and reasonable start up times.

Figure 4:
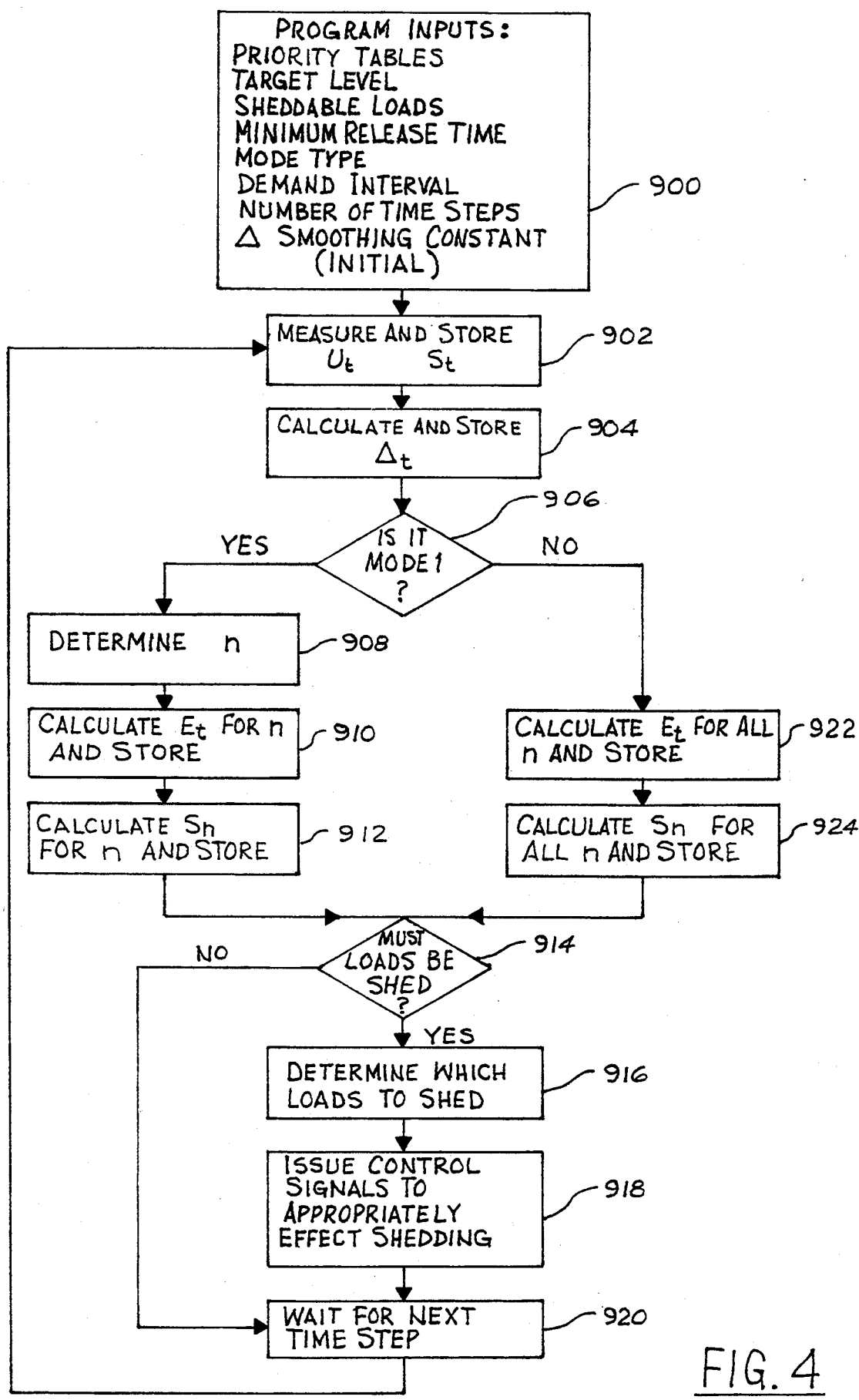
FIG. 4 is a flow chart illustrating the process of data analysis in the present invention.

FIG. 4 is a flowchart illustrating the process of data analysis in the present invention. The processing steps performed by control system 300, as illustrated by FIG. 4 contribute to reducing memory requirements, power requirements, and computational time requirements for load shedding system 10.

Referring to FIG. 4, certain variables are programmed into control system 300 (FIG. 1), as indicated by Block 900.

A value $U_t$ (the amount of energy consumed over the most recent time step) and a value $S_t$ (the amount of energy shed over the most recent time step) are measured and stored by processor 500 (FIG. 1), as indicated by Block 902.

Processor 500 calculates and stores a value for $\Delta_t$ (estimate of smoothed absolute error; Equation [2]), as indicated by Block 904.

By Block 906, processor 500 determines whether load shedding system 10 is generating in Mode 1 (employing a fixed billing interval scheme) or Mode 2 (employing a non-fixed billing interval scheme).

If processor 500 determines that load shedding system 10 is operating in Mode 1, then the "YES" branch is taken from Block 906 and processor 500 calculates and stores a value for n, the number of time steps remaining until the end of the currently extant demand time interval, as indicated by Block 908.

Processor 500 then calculates and stores a value representing a forecast of the maximum energy required per time step for the next n time steps (equation [4]), as indicated by Block 910. Subsequently, processor 500 determines and stores a value $\hat{S}_n$, representing the forecast of the average amount of electricity that needs to be shed during each time step to limit demands to the target level of demand T (Equation [6]), as indicated by block 912.

By Block 914, processor 500 determines whether any loads need to be shed. If not, then the "NO" branch is taken from Block 914 directly to Block 920, and as indicated by Block 920 processor 500 awaits the end of the current time step and then returns to Block 902 to renew its cyclical operation.

If processor 500 determines that some load shedding must occur, then the "YES" branch is taken from Block 914. Processor 500 then employs load table data with its calculated value for $S_n$ (Block 912) to determine which loads should be shed as indicated by Block 916.

Processor 500 uses determinations made according to Block 916 to provide appropriate control signals to various relays, motor controllers, controls, and the like to effect load shedding, as indicated by Block 918.

If processor 500 determines that load shedding system 10 is not operating in Mode 1, then the "NO" branch is taken from Block 906 and processor 500 calculates and stores a value representing a forecast of the maximum energy requirement per time step for all values of n from 1 to N for each time step (Equation [4]), as indicated by Block 922. As indicated by Block 924, processor 500 then calculates a value representing the forecast of the average amount of electricity that needs to be shed for all values of n, from 1 to N (Equation [6]).

The process steps followed by processor 580 operating in Mode 2 are the same as previously described in connection with Mode 1 operations for steps subsequent to Block 924.

The process illustrated in FIG. 4 provides load shedding system 10 with predictive control logic capable of adaptively effecting demand limiting for a network with accuracy and without significant on-off exercising.

In accordance with a preferred embodiment of the present invention, the load shedding system is implemented in the METASYS$_{TM}$ Facilities Management System manufactured by Johnson Controls, Inc. Facilities Management Systems manufactured by Johnson Controls, Inc. are discussed in now pending U.S. patent application Ser. No. 07/476,031, filed on Jan. 30, 1990, by Gregory A. Pascucci et al.

Figure 2:
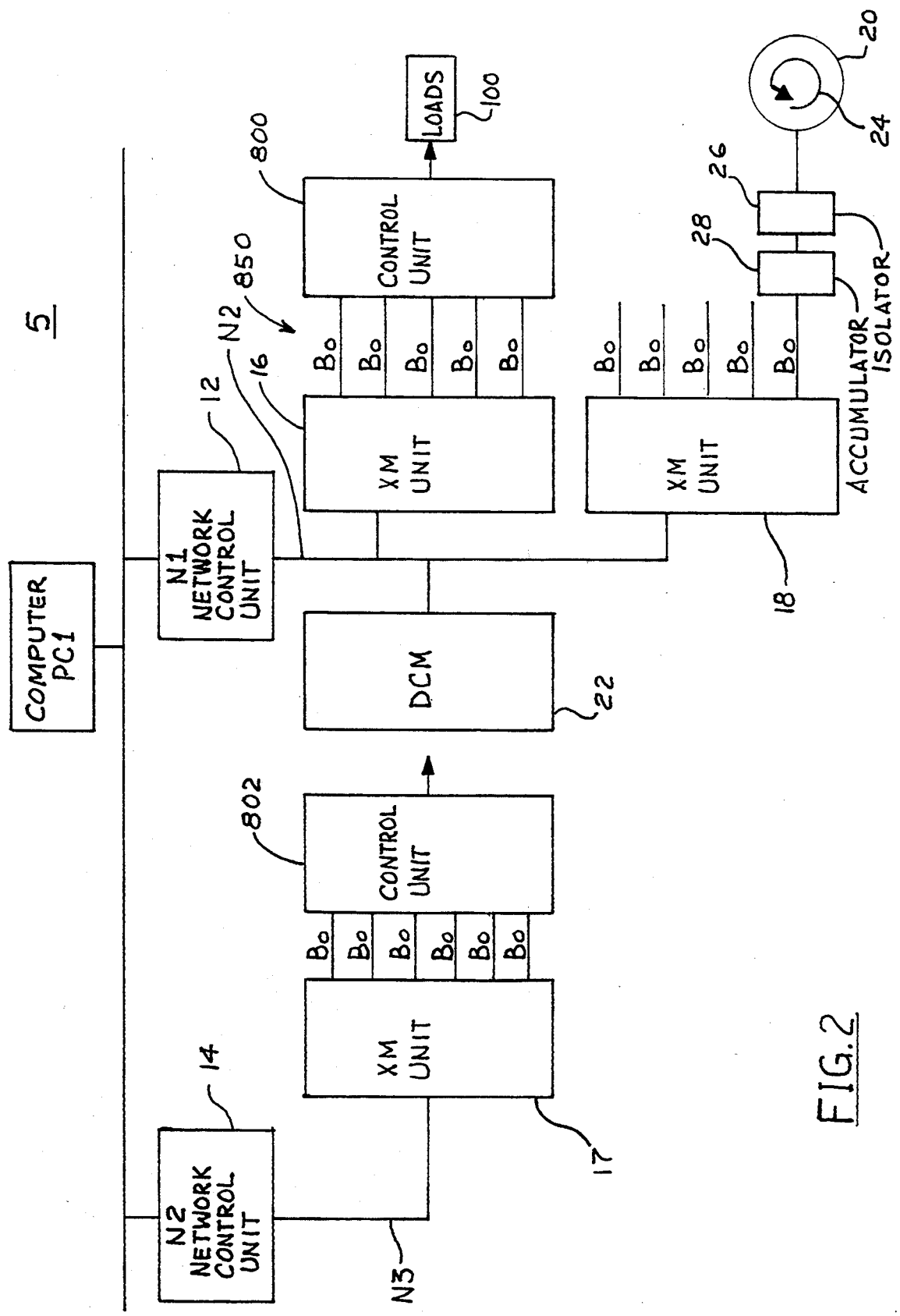
FIG. 2 is a schematic block diagram of a facilities management system configured for adjusting loads in an electrical network in accordance with the present invention.

With reference to FIG. 2, METASYS$_{TM}$ network control unit 12 is connected to network N1 and network N2. Network N1 connects unit 12 to computer PC1 and network control unit 14. Network N2 connects unit 12 to DCM 22 and XM unit 16 and XM unit 18. XM unit 16 and XM unit 18 provide inputs and outputs for the system 10. XM unit 16 and XM unit 18 here provide bit outputs 850. Each XM unit 16 can provide up to 16 bit outputs 850, and each unit 12 can service up to 500 bit outputs 850. DCM unit 22 is a special purpose input/output.

Unit 12 contains a microprocessor and memory (not shown). The memory and microprocessor in unit 12 can be configured as a single control system for a load shedding system or be connected to other units such as unit 14 to comprise a larger load shedding system 10.

Unit 12 is configured as a single control system 600 for load shedding system 5. With reference to FIG. 2 and FIG. 3, control system 600 is connected to network N1 and network N2.

Control system 600 is controlled by operating system 610. It is well understood in the art that although operating system 610 is not connected to every function block in this drawing, operating system 610 performs communication between the various function blocks, inputs, outputs, clocks, and memory. Operating system 610 has clock input 610a which receives a pulse every 5 milliseconds, and operating system 610 keeps track of time for control system 600.

Load table 620 is a memory block in control system 600. Data from personal computer PC1 is entered into load table 620. Personal computer PC1 contains a screen, disk drives, and keyboard for monitoring data and entering data. The data entered by personal computer PC1 is transmitted across network N1 into N1 communicator 630 and into load table 620. The data contains the following information: 1) the demand interval, including the number of time steps in the demand interval, N, and the length of each time step, $\delta$, 2) the target demand level of electrical consumption, T, 3) the sheddable load data, 4) the priority of sheddable loads, 5) the minimum release time for each load, 6) maximum shed time per each load, 7) time step data including the maximum number of time steps until the end of the demand interval, p; the user can select a value of p from 1 to N−1.

Control system 600 includes demand limiter 700. Demand limiter 700 further includes shed predictor 750. Shed predictor 750 is configured by inputting source code into unit 12. Source code is preferably implemented in RAM. Memory used in this embodiment generally refers to a RAM internal to unit 12. However, as is well known in the art, memory also refers to various storage devices such as ROM, or disks. The embodiment illustrated in FIG. 2 only operates in one mode, a mode similar to mode 2 discussed previously in connection with the preferred embodiment of the present invention. This mode is a sliding window mode where the load shedding system does not consider a fixed start time of the demand interval. Instead, the load shedding system looks ahead a predetermined number of time steps and calculates a shedding value for each step ahead from 1 to the predetermined number. In the following description the predetermined number of time steps ahead is represented by the character p.

Demand limiter 700 receives the amount of energy that needs to be shed from shed predictor 750 and then sheds loads up to that amount. Demand limiter sheds selected loads after communication through processing system 610 with load table 620, load timer 630, and binary control 640.

The operation of shed predictor 750 will be described with reference to FIG. 5. Shed predictor 750 determines the amount of electricity to be shed from data received from demand energy converter 650, data controlled by demand limiter 750 and past demand values 660.

Shed predictor 750 obtains the amount of energy shed in the last time step, $S_t$. In this example, the last time step is from time t to $t-\delta$, the seventh time step. The amount of shed in the last time step is calculated and stored by demand limiter 700 in memory.

Next, shed predictor 750 determines the error offset, $e_t$. Error offset, $e_t$, is described by the following equation:

$$e_t = S_t + U_t - \hat{E}_{t+j\delta}. \qquad (10)$$

The value $e_t$ is stored in memory. The walk model prediction, $\hat{E}_{t+j\delta}$, was calculated in the sixth time step by shed predictor 750 and stored in memory in unit 12 for future use.

Next, shed predictor 750 creates a value for the smoothed absolute error, $\Delta_t$, according to the following equation:

$$\Delta_t = \Delta_{t-\delta} + \lambda(|e_t| - \Delta_{t-\delta}) \qquad (11)$$

The previous smoothed absolute error value, $\Delta_{t-\delta}$, is stored in a memory location. When shed predictor 750 determines a new absolute error value, $\Delta_t$, shed predictor 750 recalls the old value, $\Delta_{t-\delta}$, out of memory. Then shed predictor 750 determines the new value, $\Delta_t$, and stores the new value, $\Delta_t$, in a memory location.

Shed predictor 750 then determines the walk model prediction according to the following equation:

$$\hat{E}_{t+j\delta} = U_t + S_t \qquad (12)$$

The walk model prediction, $\hat{E}_{t+j\delta}$, is stored in memory.

After walk model prediction, $\hat{E}_{t+j\delta}$, is determined and stored, shed predictor 750 begins its analysis for determining the amount of energy to be shed in the next time step, $\hat{S}_n$. In this analysis, shed predictor 750 determines values for forecast of the maximum energy required, $\hat{E}_{t\to t+n\delta,max}$, the amount of electricity already used over previous time steps, $$\sum_{j=0}^{N-(p+1)} U_{t-j\delta},$$

and the amount of electricity that needs to be shed per time step in order to limit the demand to the target level, $\hat{S}_n$, for all values of n from 1 to p. The value p represents the predetermined number of time steps ahead over which $\hat{S}_n$ is to be calculated. The value of p may be selected by the user through computer PC1 and stored in memory, and preferably is less than the number of time steps in a demand period.

Shed predictor 750 creates a forecast of maximum energy required, $\hat{E}_{t\to t+n\delta,max}$, in the next time step according to the following equation:

$$\hat{E}_{t\to t+n\delta,max} = \hat{E}_{t+j\delta} + 2.5\Delta_t \sqrt{(P+1)/2P} \qquad [13]$$

The forecast of the maximum energy required, $\hat{E}_{t\to t+n\delta,max}$, is solved for a particular value of p. The forecast of the maximum energy required, $\hat{E}_{t\to t+n\delta,max}$, is stored in a memory location.

Shed predictor 750 next determines the amount of electricity used in the last N−p time steps. Past demand values 660 is memory which stores values representing the amount of electricity used in each past time steps of the demand interval. For instance, if the demand interval is 15 time steps, past demand values 660 stores a value for each of the last 15 times steps. Shed predictor 750 determines the value of the amount of electricity already used over previous time steps, $$\sum_{j=0}^{N-(p+1)} U_{t-j\delta},$$

by adding the contents of past demand values 660 for the appropriate time step values. In other words, if p=10 and N=15, $$\sum_{j=0}^{N-(p+1)} U_{t-j\delta}$$

is the amount of energy used in the past 5 time steps. Once this value, $$\sum_{j=0}^{N-(p+1)} U_{t-j\delta},$$

is determined for the particular value of p, shed predictor 750 determines the amount of electricity that needs to be shed per time step in order to limit the demand to the target level, $\hat{S}_n$. This value is determined according to the following equation:

$$\hat{S}_n = \hat{E}_{t\to t+n\delta,max} + \frac{1}{p}\left(-T + \sum_{j=0}^{N-(p+1)} U_{T-j\delta}\right) \qquad [14]$$

$\hat{S}_n$ is compared to the $S_{max}$ for the time step. $S_{max}$ represents the largest value of $\hat{S}_n$ for all values of p. If $S_n$ is greater than $S_{max}$, then $S_{max}$ equals $\hat{S}_n$. $S_{max}$ is stored in a memory location.

As mentioned above, $S_n$ is determined by shed predictor 750 for all values of p from 1 to p. Before a new value of $S_n$ can be determined by equation [14], shed predictor 750 determines new values for $\hat{E}_{t-t+n\delta,max}$, and $$\sum_{j=0}^{N-(p+1)} U_{t-j\delta}$$

for a different value of p. Once these new values are determined, shed predictor 750 determines a new value for $\hat{S}_n$. This new value is then compared to $S_{max}$ as discussed above.

After shed predictor 750 determines the value $\hat{S}_n$ for all values of p, shed predictor 750 uses the value $S_{max}$ to determine the amount of energy that needs to be shed by new loads. Shed predictor 750 determines the amount of energy that actually needs to be shed by new loads according to the following equation:

$$S_{new}S_{max}-S_t+S_a. \qquad (15)$$

$S_{new}$ is a value indicating the amount of new loads that need to be shed. $S_t$ is a value stored in memory by demand limiter 700 after communication with load timer 630; $S_a$ is a value representative of the amount of energy to be restored in the next time step. Thus, the amount of energy that needs to be shed by new loads equals the total amount of energy that needs to be shed, $S_{max}$, minus the amount already being shed, $S_t$, plus the amount of energy currently being shed and about to be restored, $S_a$. Thus, relationship [15] is an application of relationships [7] and [8], described previously. If the new value of $S_{max}$ is less than zero, then shed predictor 750 sets the value of $S_{max}$ at 0. Thus, shed predictor 750 provides a value representative of the amount that is needed to be shed, $S_{max}$.

Once shed predictor 750 determines the amount to be shed in the next time step. Demand limiter 700 chooses loads to shed. Demand limiter 700 analyzes load data 620, a memory location containing information about each load. This information includes the amount of electricity saved by shedding, and the priority of the load for shedding purposes. The demand limiter 700 chooses specific loads according to the above information. Demand limiter 700 communicates data to binary control 640 indicative of specific loads.

Binary control 640 determines if the requested loads are available for shedding. For instance, if an operator has disabled the control of the load by system 5 or the load is needed for an emergency situation, XM unit 16, XM unit 18, or DCM unit 16 will transmit a signal across network N2. N2 communicator will transmit data indicative of this signal to bit control 640. Bit control 640 will store data indicative of the status of the load in a memory location. If demand limiter 700 requests an unavailable load, binary control 640 will send a demand limiter 700 a signal indicative of the status of the load. Demand limiter 700 then chooses a different load. If the load is available bit controller 640 sends a signal to demand limiter 700 indicating that the load is available.

Load timer 630 also analyzes the availability of loads that demand limiter 700 has chosen. For example, when a load is released, load timer 620 determines that minimum on time of the load from load table 620 and signals the operating system 610 to signal the load timer 630 when that time has expired. If the minimum on time has not been reached and demand limiter 700 requests that load, load timer 630 sends a signal to demand limiter 700 to choose another load. Demand limiter chooses another load in accordance with $S_{max}$ and priority data located in load table 620. If the load is available to be shed, load timer 630 sends a signal to demand limiter 700 indicating that the load can be shed.

When both load timer 630 and binary control 640 indicate that the selected load is available, demand limiter 700 then sends the appropriate shed command to binary control 640. Binary control 640 sends a signal to N2 communicator 660. N2 communicator 660 transmits a signal to XM unit 16 or XM unit 18. XM unit 16 or XM unit 18 changes one of bit outputs 850 on the appropriate load. Control 80 turns off the appropriate load in response to the signal on one of bit outputs 850.

After the energy that is shed is greater than or equal to $S_{max}$, the demand limiter 700 does not choose any more loads. Demand limiter 700 waits for operating system 610 to signal the end of the present time step. When demand limiter 700 receives this signal, demand limiter 700 begins the shedding analysis again.

Demand limiter 700 also determines values used by shed predictor 750. These values are the amount of energy shed in the last time step, $S_t$, and the values for past demand values 760, and the amount of energy about to be restored, $S_a$.

Demand limiter 700 determines which selected loads are shed and what amount of energy is saved by shedding the selected loads. Through communication by demand limited 700 with other elements in control system 600, necessary information for such determinations is available from binary control 640, load timer 630, and load table 620. Demand limiter 700 computes $S_t$ by adding the energy saved by the shedding of each load in the previous time step. Demand limiter 700 stores the value, $S_t$, in memory.

Demand limiter 700 also determines the values for past demand values 760 indicative of the amount of energy actually used in particular times steps. This information originates at meter 20 (FIG. 2). Sensor 24, located inside meter 20, provides an isolator 26 with a signal indicative of the amount of energy used by the building. XM unit 18 receives a signal from isolator 26 via an accumulator 28. XM unit 18 provides this signal to N2 communicator 660. N2 communicator 620 provides this signal to signal converter 670. Signal converter 670 changes signal from communicator 620 into a data value indicative of the amount of energy used. Energy converter 650 receives that data value creates another data value indicative of the amount of electricity used per unit time for the time step. This value is received by demand limiter 660 and stored in past demand values 660 according to its particular time step.

Demand limiter 700 also determines the value of the amount of energy about to be restored, $S_a$. When a load is shed, load timer 630 determines the maximum off time for the particular load from load table 620. Load timer 630 communicates to operating system 610 to signal load timer 630 when the maximum off time has expired. Load timer 630 receives these signals and sends a signal to demand limiter 700 that particular loads are about to be restored. Demand limiter 700 determines the amount of energy shed associated with the particular loads from load table 620. Demand limiter 700 determines a value for the amount of energy to be restored, $S_a$ from the information in load table 620.

With reference to FIG. 2, in an alternative embodiment system 5 may be comprised of more than one METASYS$_{TM}$ unit. N1 network control unit 12 and N2 network control unit 14 are connected via network N1. N1 network control unit 12 determines the amount of electricity that needs to be shed and transmits control signals to control unit 800. N1 network control unit 12 also transmits data signals from N1 communicator 632 to N2 network control unit 14. N2 network control unit 14 receives the signal in its own N1 communicator. N2 network control unit 14 transmits appropriate control signals via XM unit 17 to control unit 802. N2 network control unit 14 also transmits signals indicative of load status to N1 network control unit 12 through network N1. The control signals direct control unit 800 to shed and restore appropriate loads. Using multiple network control units allows control of more control units and more networks.

It will be understood that while various conductors/connectors are depicted in the drawings as single lines, they are not so shown in a limiting sense and may comprise plural conductors/connectors as is understood in the art. Further, the above description is of a preferred exemplary embodiment of the present invention and is not limited to the specific form shown. For example, while the system was described for use in the Metasys$_{TM}$ facilities Management System, the invention could be used in any load shedding system. Likewise, the control system could be programmed in various ways without departing from the spirit of the invention. Also, other modifications to the analysis and functions of the control system as well as the arrangement and design of the elements can be made without departing from the spirit of the invention as expressed in the appended claims.

What is claimed is:

1. An apparatus for controlling aggregate electrical load of an electrical system to a load level below a predetermined target level, the apparatus comprising:
   a sensor means for sensing said aggregate electrical load and generating load information representative of said aggregate electrical load;
   a memory means for storing information; and
   a processor means for executing a predetermined program;
   said processor means, said memory means, and said sensor means being operatively interconnected;
   said processor means effecting storage of said load information in said memory means;
   said processor means including a predictor means for forecasting a predicted load to be shed for a predetermined future period to keep said load level below said target level, said processor means issuing shed control signals to selected devices within said electrical system to shed appropriate devices of said selected devices in accordance with said predicted load to be shed, said processor means effecting storage of shed information indicative of the amount of electrical load being shed, said predictor means providing a forecast of energy requirements for said predetermined future period in accordance with said load information and said shed information, said predictor means further providing a maximum forecast of energy requirements for said predetermined future time period in accordance with an error factor and said forecast of energy requirements, said processor means calculating said predicted load to be shed in accordance with said maximum forecast of energy requirements, wherein said error factor is calculated from differences between said forecast of energy requirements for said predetermined future period made during a previous time period and a sum of said load information and said shed information during said previous time period.

2. An apparatus for controlling aggregate electrical load of an electrical system to a load level below a predetermined target level as recited in claim 1 wherein said memory means stores priority information regarding specific devices within said electrical system, said priority information reflecting order of shedding preference among said specific devices; said processor means issuing said shed control signals in accordance with said priority information.

3. An apparatus for controlling aggregate electrical load of an electrical system to a load level below a predetermined target level as recited in claim 2 wherein said error factor is calculated from differences between said between said forecast of energy requirements for said predetermined future period made during a plurality of previous time periods and a sum of said load information and said shed information during said plurality of previous time periods.

4. An apparatus for controlling aggregate electrical load of an electrical system to a load level below a predetermined target level as recited in claim 1 wherein said error factor allows said apparatus to adapt said predicted load to demand characteristics of said electrical system.

5. An apparatus for controlling aggregate electrical load of an electrical system to a load level below a predetermined target level as recited in claim 1 wherein said error factor is related to the following expression:

$$\text{Error factor} = (U_t + S_t - E_{t,t-\delta}\ Z_\alpha(1.25)\sqrt{\frac{n+1}{2n}}$$

where:
   $U_t$ = is said load information;
   $S_t$ = is said shed information;
   $E_{t,t\delta}$ = is said forecast of energy requirements for said predetermined future period made during a previous time period;
   $Z_\alpha$ = is a standardized normal deviate at the $\alpha$ % confidence interval; and $$\sqrt{\frac{n+1}{2n}}$$

= is related to the number of time periods until said predetermined future time period.

6. An apparatus for shedding electrical loads of an electrical system to maintain power consumption below a predetermined target level, the apparatus comprising:
   sensor means for sensing said power consumption of said electrical system and generating load information representative of said power consumption;
   memory means for storing information; and
   processor means for executing a predetermined program;
   said processor means, said memory means, and said sensor means being operatively interconnected;
   said processor means effecting storage of said load information in said memory means;

said processor means including a predictor means for forecasting a predicted load to be shed for a predetermined future period to keep said load level below said target level, said processor means issuing shed control signals to selected electrical loads within said electrical system to shed appropriate electrical loads of said selected electrical loads in accordance with said predicted load to be shed, said processor means effecting storage of shed information indicative of the amount of electrical load being shed, said predictor means employing a statistical algorithm involving a forecast of energy requirements for said predetermined future time period calculated from said load information and said shed information, said statistical algorithm further generating a maximum forecast of energy requirements for said predetermined future time period in accordance with an error factor and said forecast of energy requirements, said predicted load to be shed being calculated in accordance with said maximum forecast of energy requirements, wherein said error factor is calculated from differences between said forecast of energy requirements for said future period made during at least one of a plurality of previous time periods and a sum of shed information and load information during said at least one of said plurality of previous time periods.

7. An apparatus for shedding electrical loads of an electrical system to maintain power consumption below a predetermined target level as recited in claim 6 wherein said memory means stores priority information regarding specific devices within said electrical system, said priority information reflecting order of shedding preference among said specific devices; said predictor means further involving said priority information in employing said statistical algorithm.

8. An apparatus for shedding electrical loads of an electrical system to maintain power consumption below a predetermined target level as recited in claim 6 wherein said error factor is calculated from differences between said forecast of energy requirements for said future period made during said plurality of previous time periods and a sum of said shed information and load information during said plurality of previous time periods.

9. An apparatus for shedding electrical loads of an electrical system to maintain power consumption below a predetermined target level as recited in claim 6 wherein said error factor allows said apparatus to adapt said predicted load to demand characteristics of said electrical system.

10. An apparatus for shedding electrical loads of an electrical system to maintain power consumption below a predetermined target level as recited in claim 6, wherein said error factor is related to the following expression:

$$\text{Error factor} = (U_t + S_t - E_{t,t-\delta} Z_\alpha(1.25)) \sqrt{\frac{n+1}{2n}}$$

where:
$U_t$ = is said load information;
$S_t$ = is said shed information;
$E_{t,t-\delta}$ = is said forecast of energy requirements for said predetermined future period made during a previous time period;
$Z_\alpha$ = is a standardized normal deviate at the $\alpha$ % confidence interval; and $$\sqrt{\frac{n+1}{2n}}$$

= is related to the number of time periods until said predetermined future time period.

11. A method of controlling aggregate electrical load of an electrical system to a load level below a predetermined level, said electrical system including a sensor for providing load information representative of the electrical load being used, a processor configured to issue shed control signals to selected devices within said electrical system to shed appropriate devices of said selected devices to keep said low level below said predetermined target level, said processor generating shed information indicative of the amount of electrical load being shed, and memory means for storing said load and shed information, the method comprising the steps of:

forecasting an energy requirement for a predetermined future in accordance with said load information and said shed information:

calculating a maximum forecast of energy requirements for said predetermined future time period in accordance with said forecast of energy requirements and an error factor, said error factor being related to a difference between said forecast of energy requirements during at least one of a plurality of previous periods and load information during at least one of said plurality of previous periods;

calculating a predicted load to be shed for said future time period in accordance with said maximum forecast of energy requirements; and issuing shed control signals to said selected devices within said electrical system to shed appropriate devices of said selected devices to keep said load level below said predetermined target level, wherein said error factor is calculated from differences between said forecast of energy requirements for said predetermined future time period made during a previous time period and a sum of said load information and said shed information during said previous time period.

12. The method of claim 11, wherein said error factor is defined by the following expression:

$$(U_t + S_t - E_{t,t-\delta} Z_\alpha(1.25)) \sqrt{\frac{n+1}{2n}}$$

where:
$U_t$ = is said load information;
$S_t$ = is said shed information;
$E_{t,t-\delta}$ = is said forecast of energy requirements for said predetermined future period made during a previous time period;
$Z_\alpha$ = is a standardized normal deviate at the $\alpha$ % confidence interval; and $$\sqrt{\frac{n+1}{2n}}$$

= is related to the number of time periods until said predetermined future time period.

13. The method of claim 11, wherein said memory means stores priority information regarding specific devices within said electrical system, and said shed control signals are issued in accordance with said priority information.

14. The method of claim 11, wherein said error factor allows said method to adapt said maximum forecast of energy requirements to random demand characteristics of said electrical system.

* * * * *